May 14, 1929.  G. A. OVERSTROM  1,713,143
VIBRATING SCREEN
Filed Feb. 23, 1924   7 Sheets-Sheet 1

May 14, 1929. G. A. OVERSTROM 1,713,143
VIBRATING SCREEN
Filed Feb. 23, 1924 7 Sheets-Sheet 2

May 14, 1929.  G. A. OVERSTROM  1,713,143
VIBRATING SCREEN
Filed Feb. 23, 1924   7 Sheets-Sheet 6

Patented May 14, 1929.

1,713,143

UNITED STATES PATENT OFFICE.

GUSTAVE A. OVERSTROM, OF PASADENA, CALIFORNIA.

VIBRATING SCREEN.

Application filed February 23, 1924. Serial No. 694,538.

This invention relates to vibrating screens, and particularly to screens to which are imparted a very high frequency of vibration to effect the separation and grading of various materials, such as sand, gravel, ores, coal, or the like.

The object of the invention is to provide a vibrating screen which is simple in structure, economical to manufacture and efficient in operation, and wherein a high rate of vibration of the screen or screens is secured by means of an unbalanced pulley device.

A further object of the invention is to provide a screen structure of the nature referred to, wherein the rate of vibration may be altered or varied by means of removable and replaceable weights employed to secure the unbalanced action of the vibrator.

A further object is to provide a simple and compact structure of unbalanced pulley to impart the vibratory movements to the screen, and wherein efficient lubrication of the pulley structure is secured without danger of leakage through centrifugal force when the unbalanced pulley is driven at a high rate of speed.

A further object is to provide means to compensate for unequal wear due to the unbalanced condition of the pulley.

A further object of the invention is to provide an outside supporting framework within which the screen box is suspended and vibrates.

A further object is to provide a simple and improved structure of delivery chutes.

A further object is to provide an improved screen cloth structure and mounting and tensioning means therefor, to secure an efficient screening operation.

Other objects of the invention will appear more fully hereinafter.

The invention consists substantially in the construction, combination, location and relative arrangement of parts, all as will be more fully hereinafter set forth, as shown in the accompanying drawings, and finally pointed out in the appended claims.

Referring to the accompanying drawings:—

The same part is designated by the same reference numeral wherever it occurs throughout the several views.

In my pending application for patent, Serial No. 413,376, filed September 28, 1920, Patent Number 1,621,949, March 22, 1927, I have shown, described and claimed a vibrating screen structure wherein the screen box or screen cloth carrying frame is yieldingly suspended on springs and is vibrated by means of a rotary unbalanced pulley. My invention relates generally to vibrating screens of the same type and mode of operation, and consists in certain features of construction incorporated therein, and in certain improvements thereon, all as will be more fully pointed out hereinafter.

In my prior application, above referred to, I have shown the spiral springs by which the vibrating screen box is carried and suspended, as being held by clamps bolted to a stationary beam. According to the present invention, I propose to incorporate the spring supporting beam into an enclosing framework for the screen box, the springs being received and resting in boxes bolted to the enclosing framework, or a beam member forming part thereof, and being held in place by means of clamp members bolted to said boxes and extending partially over the upper portions of the springs.

Referring to the drawings, the screen box enclosing framework is shown in this instance as including side members each having an upper and a lower longitudinally extending beam 1, 2, respectively disposed in parallel relation to each other, and suitably connected and braced to each other by means of vertical posts 3 and brace members 4 and also, if desired or required, by bolts 5. The corresponding ends of the upper beams 1 at opposite sides of the machine are connected together, as, for instance, by means of bolts 6, while the lower beams 2 at opposite sides of the machine may be connected together in any suitable manner, as by means of cross beams 7 and bolts 8.

An enclosing framework, such as above described, for the vibrating screen box affords the very important advantages of a protection for the screen box in transportation and in handling and setting up the machine for operation, the lower beams 2 constituting supporting base members for the entire structure. In addition, I am also enabled to more accurately and satisfactorily position the screen box and the supporting boxes for the screen box suspending springs. Thus the entire machine is made into a single unit which is complete within itself.

The vibrating screen box within which the screen cloths are carried, may be of any suitable or desired structure. In the illustrative arrangement shown, this consists of a framework including upper and lower stringers, 9, 10, which are disposed in parallel relation to each other at opposite sides of the structure, said stringers at each side being connected together by vertically disposed side plates 11 and bolts 12, and the corresponding stringers at opposite sides of the box are connected together by the cross members 13, 14. The cross members 15, spaced apart from each other, and preferably located at a point intermediate the ends of the box frame serve to connect the upper stringers 9, and they also form part of the structure in which the unbalanced pulley is mounted, as will be more fully explained hereinafter.

It will be observed that the screen box frame is of generally cubical shape, and should be of such relative size as to be received and to freely move or vibrate between the side portions of the enclosing framework when properly positioned in place and suspended therein.

In the construction and operation of vibrating screen structures, I have found it exceedingly desirable to provide means by which the screen cloths may be easily and expeditiously removed independently of each other in order that various kinds of material may be handled on the same machine by replacing the screen cloths so as to use screens of the required mesh, according to the particular character of material to be screened, and also in order that any particular screen cloth may be repaired or replaced by a new one, in case of injury or wear, without disturbing the other screens. I therefore propose, in accordance with my present invention, to employ independent screen units each consisting of a frame structure and a screen cloth assembly, and I removably mount each screen unit in the screen box structure above described. To accomplish this result, I form guide ways or channels on the inner face of each side plate 11 of the screen box, into which slide the side members of the screen units.

The frame structure of each screen unit consists of side members or stringers 16, and intermediate parallel members 17. These stringers and intermediate members are preferably of wood, and are rigidly connected together into a unitary frame structure by means of cross connections 18. In order to prevent breakage through crystallization due to the action of the high rate of vibration imparted to the screen box, I prefer that the cross connections 18 be tubular, particularly where screens of considerable width are to be constructed. My invention, however, is not to be limited or restricted in this respect. The cross connecting members 18 pass transversely through the intermediate members 17, and have their ends received in seats formed in the inner faces of the side stringers 16, and securing bolts 19 serve to rigidly secure the side stringers 16 together. Where tubular cross members 18 are used, these securing and clamping bolts may pass longitudinally through the tubes 18.

The screen cloth assembly in one embodiment of my invention consists of a sub-screen cloth 20 of comparatively large mesh and a limiting screen cloth 21 of relatively smaller mesh, placed flatwise upon each other, the limiting screen cloth being uppermost. The side edges and the ends of the superposed screen cloths are folded over upon themselves, as more clearly shown in Fig. 10. A metal binder strip 22 is formed with a portion thereof bent or folded over upon itself, such folded portion being received within the fold of the edges of the screen cloths. One leg of the folded portion of the binder strip is then bent upwardly and outwardly over the edge portions of the screen cloths so as to embrace the same. The edge of the other leg portion of the folded metal strip is preferably turned upwardly to a slight extent, as indicated at 23. The screen frame structure and the screen cloth assembly are constructed and assembled separately. The frame structure is first slid into place in the channels 24 of the side plates 11 of the screen box, and then the screen cloth assembly is slid into the box, the edges of the screen cloths being received upon the upper faces of the side stringers 16. If desired, and in order to facilitate the insertion and removal of the screen cloth assembly into place upon the screen frame structure metal wearing plates 25 may serve as facing plates for the upper surfaces of the stringers. The screen cloths rest intermediate their edges upon the intermediate members 17 of the screen frame structure. These intermediate members 17 are preferably faced on their upper surfaces with metal strips 26 which are oval or crown shaped at their upper supporting surfaces. The intermediate portions of the screen cloth rest on said strips 26 which extend from end to end of the screen frame.

At the front or feed-in end of the screen box the ends of the screen cloths are folded over upon themselves and are engaged by metal binder strips of the same formation and in the same way as above described with reference to the edge portions of the cloths. These end portions of the screen cloths with their associated metal binder strips are received on wearing plates 25 carried by cross members 27 of the screen frame structure.

Figure 1:
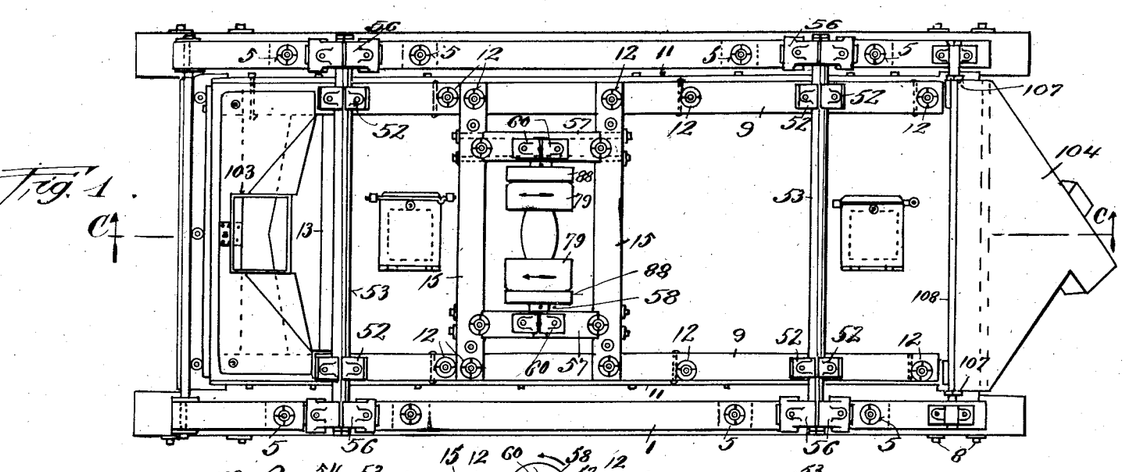
Fig. 1 is a top plan view of a vibrating screen embodying the principles of my invention.
Figure 2:
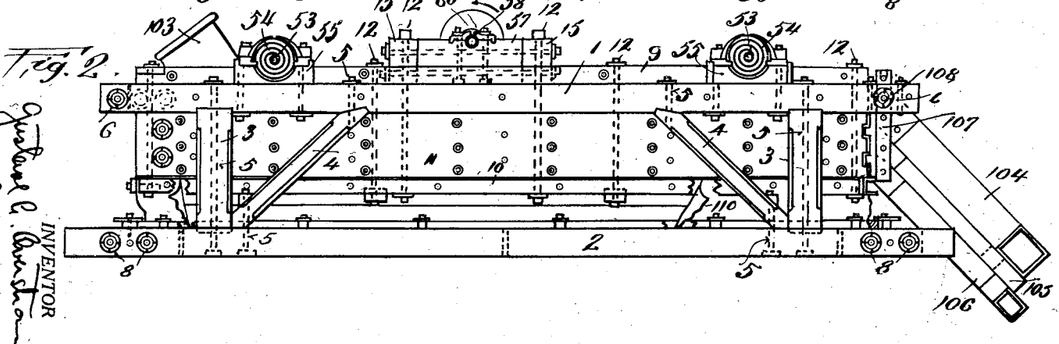
Fig. 2 is a view in side elevation of the same.
Figure 3:
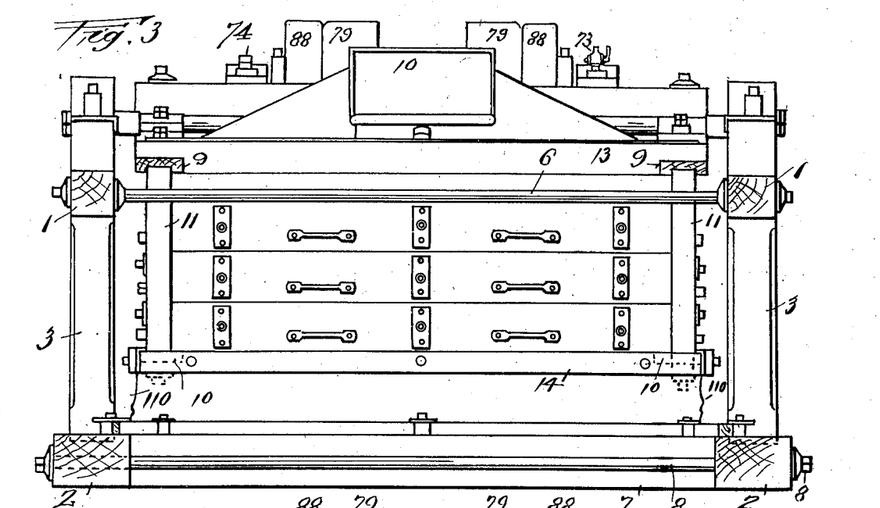
Fig. 3 is a view in elevation of the head end of the machine.
Figure 4:
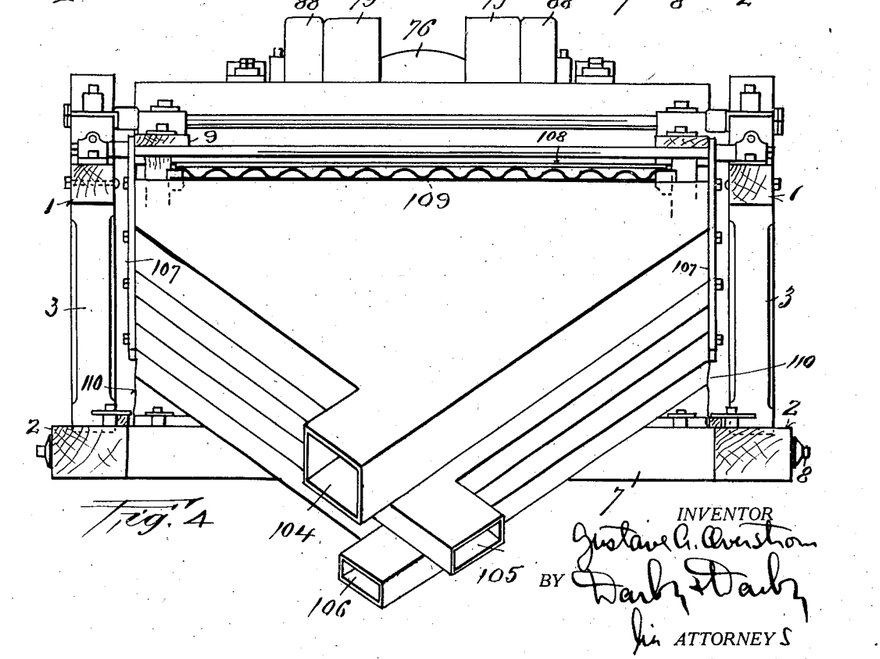
Fig. 4 is a similar view of the tail or delivery end.
Figure 5:
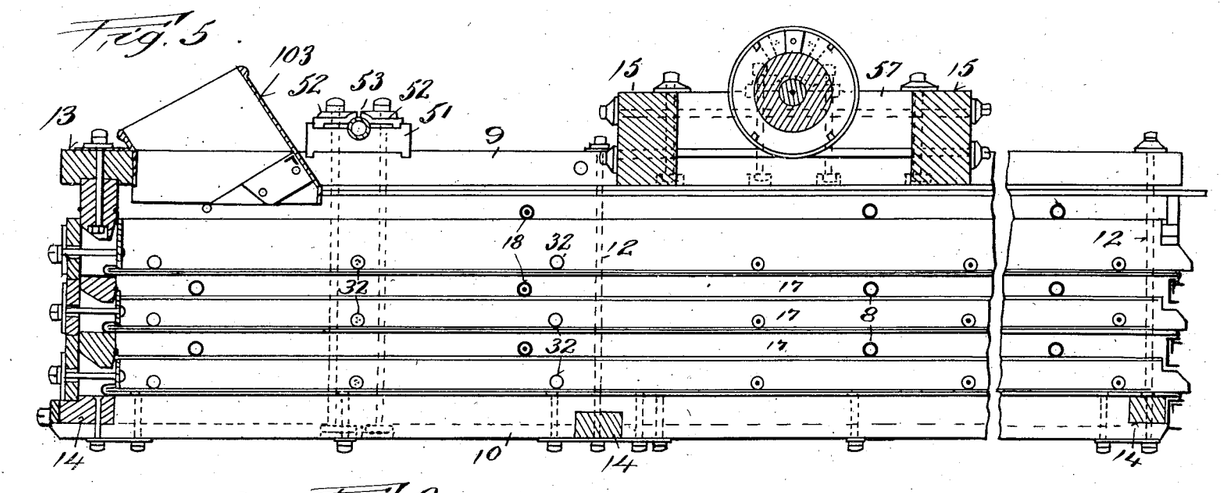
Fig. 5 is a view in vertical central longitudinal section through the machine on the line C, C, Fig. 1, the delivery chutes being omitted.
Figure 6:
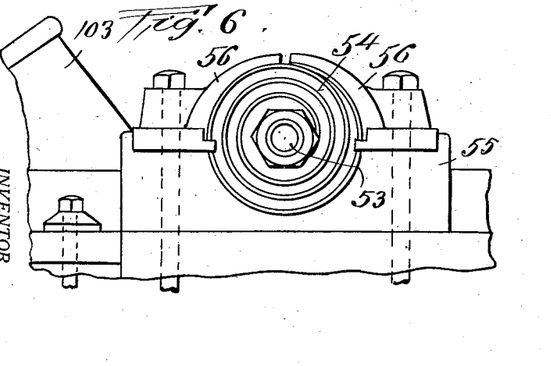
Fig. 6 is a broken view in side elevation showing on a larger scale one of the spiral springs employed to suspend the vibrating structure.
Figures 7, 8:
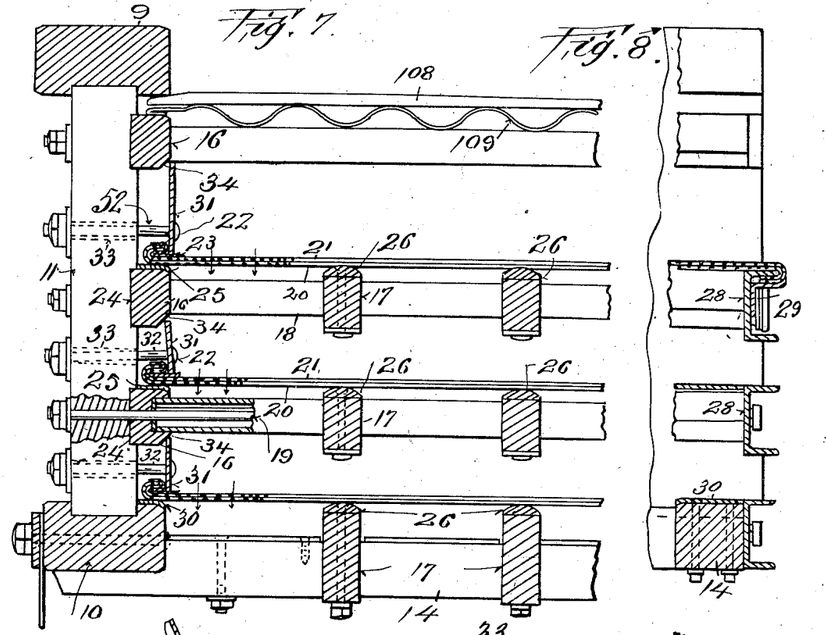
Fig. 7 is a view in transverse section through one side of the vibrating portion of the structure illustrating one form of means for supporting the side edges of and transversely tensioning the screen cloths.
Fig. 8 is a similar view through the delivery end of the same, illustrating a form of means for supporting and securing the delivery ends of the screen cloths.

The lower or delivery ends of the screen cloths are bent or folded over an edge flange of transverse channel members 28 of the screen frame structure, see Fig. 8, and are clamped therein by an angle plate 29, bolted to the channel members 28.

Figures 9, 10:
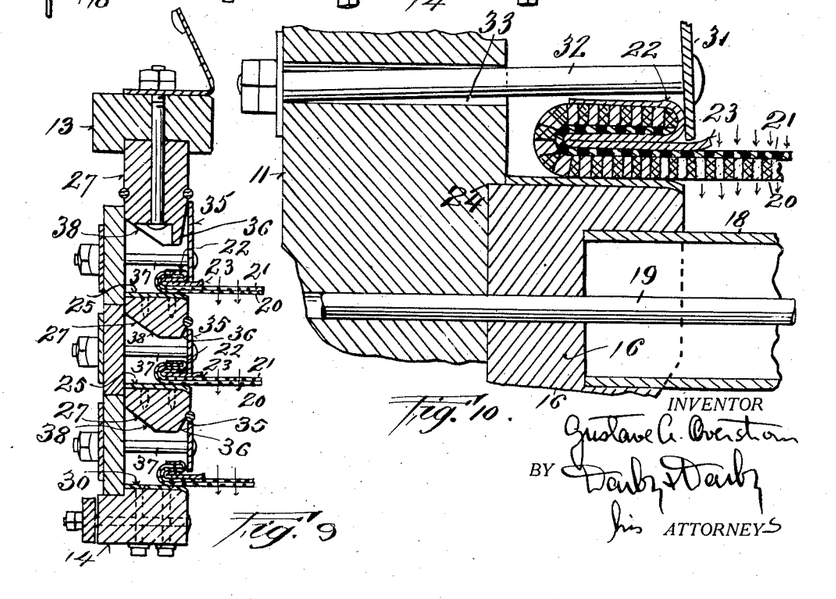
Fig. 9 is a similar view through the head or receiving end.
Fig. 10 is an enlarged broken detail view in section illustrating the manner of securing the desired transverse and head end tensioning of the screen cloths.

If desired, and as shown in Figs. 7, 8 and 9, where several sets of screen units are employed in the same machine, the lowermost screen assembly may be received and rest at its ends and edges on the stringers 10 and 14 of the screen box, said stringers having wearing plates 30, similar in purpose and function to the wearing plates 25, above referred to. In such case, the intermediate members 17 are fastened to the transverse connections 14 of the screen box.

Figure 11:
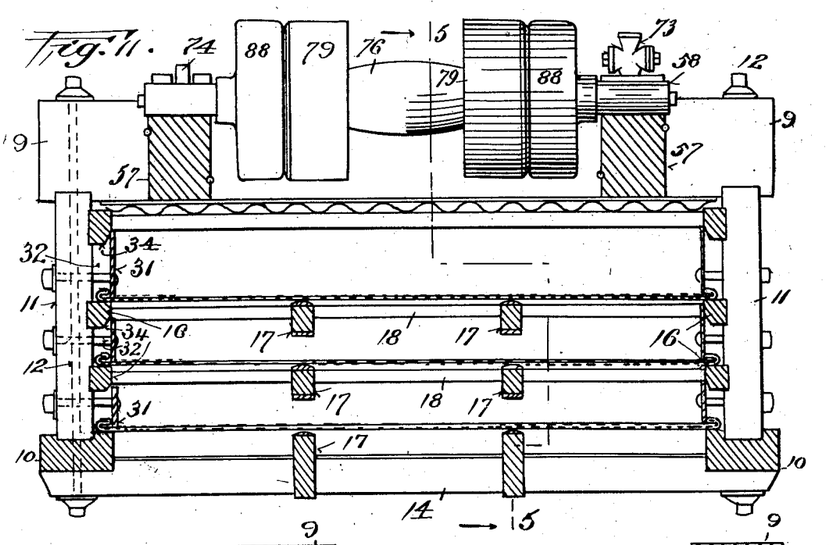
Fig. 11 is a view in transverse section through the vibrating portion of the structure.

The transverse and longitudinal tensioning of the screen cloths may be effected in various ways. In the arrangement shown in Figs. 7, 10 and 11, the transverse tensioning of the screen cloths is accomplished by means of stretcher plates, disposed to extend longitudinally of the screen cloth assembly at the edges thereof. These stretcher plates are disposed vertically and rest at their lower edges upon the upper surfaces of the edge portions 23 of the screen edge engaging strips 22, and bear laterally and outwardly against the bends of the strips 22 which receive the folded over edges of the cloths. At their upper edges, these stretcher plates 31 bear laterally against the inner surfaces of the side stringers or members 16 of the screen frame structure. Suitable bolts 32 passing through the side plate 11 of the screen box engage the stretcher plates, and when tightened up, they act to draw the stretcher plates outwardly and laterally, fulcruming about their lateral bearing against the stringers 16, thereby most simply and efficiently stretching and tensioning the screen cloths transversely. In order to permit the fulcruming movement referred to of the stretcher plates, the openings 33 in the side plates 11 through which the stretcher bolts 32 pass are of larger area than the size of the bolts, thereby permitting the tilting of the bolts during the stretching movements of the plates 31. Also to still further facilitate this fulcruming action of the stretcher plates, instead of the upper edges of said plates bearing flatwise against the inner surface of the stringers 16, I prefer to chamfer off or bevel the lower inner edges of said stringers, as indicated at 34, the fulcrum edge of the stretcher plate being received against the inclined surface afforded by this chamfer.

A similar arrangement for tensioning the screen cloth units endwise is shown in Fig. 9, as applied to the upper or feed-in end of the said cloths. In this case the stretcher plates 35 extend transversely across the screen cloth unit and fulcrum at their upper edges against chamfered or beveled surfaces 36 of the cross members 27, said plates being tightened into stretching relation by bolts 37. If desired, and as shown, and in order to facilitate the assembly in place or removal of the stretcher plates the cross members 27 are cut away on their outer lower portions, as indicated at 38, to afford space for the insertion or removal therethrough of the said plates. It will be understood that the transverse tensioning of the screen cloths is effected by the stretcher plates at opposite side edges of the cloths working against each other, while the longitudinal tensioning is effected by the end stretcher plates 35 at one end of the cloths working against the clamping means which secure and hold the opposite ends of the cloths. It will also be observed that by employing edge stretcher plates which extend lengthwise throughout the whole length of the cloths and end stretcher plates which extend the entire transverse width of the cloths, an efficient and uniform tensioning of the screen cloths is effected throughout the entire area of the screens.

Figure 12:
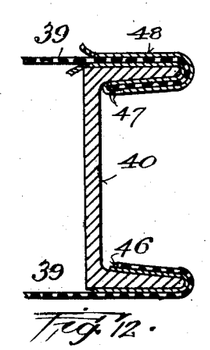
Figs. 12 and 13 are broken detail views in transverse section illustrating a modified arrangement for securing and tensioning the screen cloth.
Figure 13:
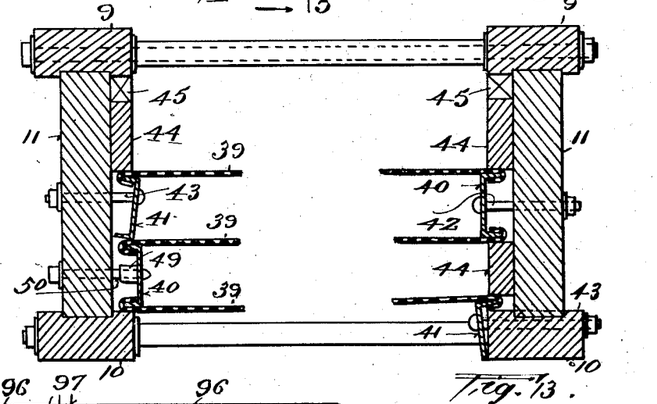

In Figs. 12 and 13, I have shown modified structures for stretching and tensioning the screen cloths, wherein the edges of the screen cloths 39 are folded over the flanges of channel beams 40, 41 disposed at opposite sides of the screen box. One member 40 of each pair of these channel beams is adjustably secured by bolts 42 to the inner walls of the side plates 11 of the screen box, while the other member 41 of such pair is permitted a fulcruming action when tightened up by its securing bolts 43, to stretch and tension the screen cloth. In this case, the channel beams 40, coacting with cleats or spacers 44, or otherwise, serve principally as clamping and holding devices for the edges of the screws while the beams 41 effect the desired tensioning. If desired, however, both or either of the beams 40, 41, may be employed to effect the tensioning action and in Fig. 13 I have shown variations in this respect. For example, the upper left hand and lower right hand arrangement shown in this figure may be employed to apply independent tensioning to one edge only of a single screen cloth while the arrangements shown at the upper right hand and lower left hand portions simultaneous stretching is effected of two adjacent screen cloths. Where the twin tensioning means are employed the channel members 40 themselves form spacers, but where individual tensioning is to be effected the spacers 44 are used. The members 44, if desired, may serve not only to coact with the beams 40 or 41, but also to protect the side plates 11 of the screen box against wear, as well as to hold the beams pressed solidly to the lower beams 10 of the screen box. Wedges, indicated at 45, are employed in carrying out the function of holding down the beams rigidly to the base beams 10. These wedges are not driven up tight until the screen cloths have been properly tensioned, but when such tensioning has been effected said wedges are driven up tight, thereby securely clamping and holding all the parts in their relative positions for efficient operation. In order to protect the edges of the screen cloths which engage over the flanges of the stretching beams, I may interpose a metal strip between the bearing surfaces of the cloth and beam flanges. Where a heavy screen cloth is used, a metal strip 46 bent to channel shape is slipped over the flange of the beam and the edge of the screen cloth is then doubled over this strip. Where lighter cloths are employed, two channel strips 47, 48 are preferable. These strips are nested into each other and are disposed one on the outside and one on the inside of the fold in the edge of the cloth, as shown in Fig. 12. This arrangement not only effectually prevents slipping of the screen cloth when stretched, or while being stretched, but it also allows the flimsy screen cloth to be easily slipped into place on the stretching beams without removal of the latter from the screen box. In case of the use of screen cloths of very fine wire and mesh, I may only use the single bent stamping 46 and solder the cloth to it.

Where double or twin stretching beams 40 are employed, it is difficult to slip the screen cloths into place thereon after said beams are secured in place in the box. In such case, the screen cloths are applied to the beams and then the latter are dropped into place within the screen box. To permit this, I rivet or weld, or otherwise secure, nuts 49 to the outwardly presenting side surface of the beam and a tappet bolt 50 is inserted through the side plate 11 of the screen box to thread into the nut 49, in order to effect the desired stretching adjustment of the beam.

Figure 19:
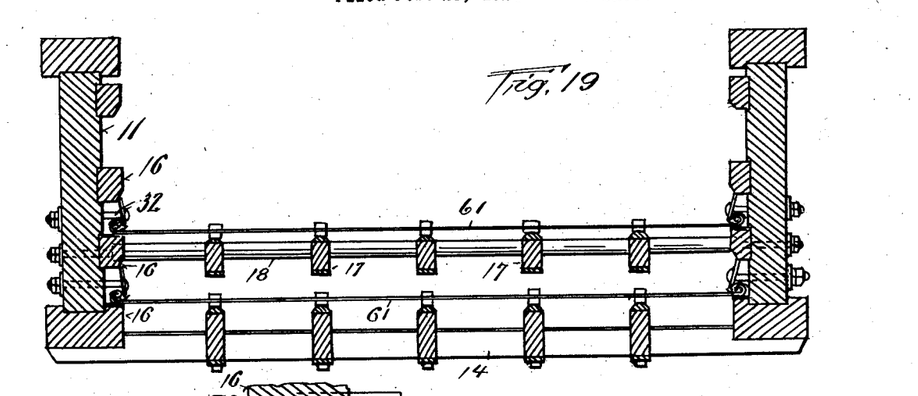
Fig. 19 is a view in transverse section showing a preferred embodiment of my invention, particularly with reference to the transverse tensioning and the longitudinal supporting devices for the screen cloth.
Figure 20:
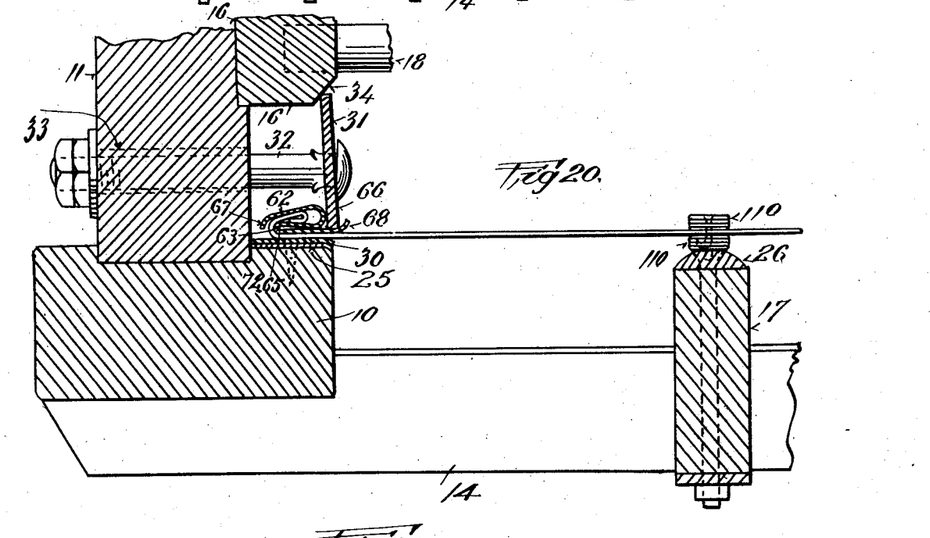
Fig. 20 is a broken view in transverse section on a larger scale, to more clearly illustrate the structure shown in Fig. 19.
Figure 21:
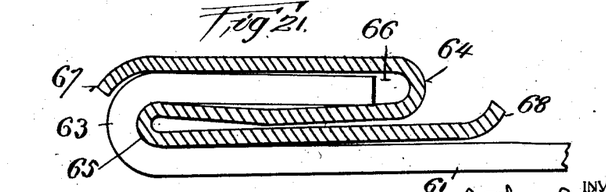
Fig. 21 is a detail view illustrating a preferred arrangement of tensioning binder for the edge of the screen cloth.

In Figs. 19, 20 and 21, I have shown an arrangement for supporting and tensioning the screen cloths which I have found most efficient in use and which, because of its advantageous features, I prefer in many cases to employ.

In this structure, I dispense with one of the screen cloths and use a single cloth 61 for each screen unit or element. Where a light screen cloth is used, the edge of the cloth is first folded over upon itself as indicated at 62, Fig. 20, and then the folded portion is again folded over upon the body of the cloth to form a wider fold, the outer edge of the bend of which is indicated at 63. The binder strip is bent or folded upon itself thereby forming an edge bend 65, which is slipped into and bottoms against the inner surface of the edge bend 63 in the screen cloth. The inner portion of the upper leg of the binder strip is bent upwardly and outwardly to form the bend 64 into which the edge fold 62 of the screen cloth enters, but, in practice, I prefer that the screen cloth bend 62 does not bottom against the inner surface of the bend 64 in the binder strip, thereby leaving a clearance space 66 between the edge of the cloth and the inner surface of the strip bend 64. The upper leg portion of the binder strip extends outwardly from the bend 64 and its extreme edge portion 67 is downwardly bent to hug over the outer surface of the bend 63 in the cloth. The inner edge 68 of the binder strip is turned upwardly and the corresponding edge of the wear plate 25 is turned downwardly, as indicated at 30. This permits the vertical vibrations of the cloth to be effected without undue wear in working or bending over sharp edges, thereby greatly increasing the life of the cloth.

Where a comparatively heavy cloth is employed I find that the initial edge bend 62 of the cloth can be dispensed with, as indicated in Fig. 21, but the other features above described with reference to the formation and application of the binder strip to the edge of the screen cloth are retained.

I have found in practice that in handling certain kinds of material, a cutting and rupturing action is imposed upon the screen cloth where it rests on and pounds or hammers against the armored upper surfaces of the longitudinal supports 17. Particularly is this true where the material being screened contains sharp crystalline particles, as in the case of sand, coal, ores and the like, which lodge upon the upper surface of the armor strips 26. To avoid this objection I propose to apply wear strips 70, of rubber, cloth, belting, or other suitable material, to the cloth so as to take the impact of the screen cloth when in vibration, upon the armor surface 26. In practice, a single wear strip 70 may be applied to the under surface of the cloth or, and preferably, a pair of such strips are clamped together with the screen cloth disposed between them, as shown in Fig. 20. In operation, the screen cloth, clamped, tensioned and supported as above described, not only vibrates or moves with the box in which it is mounted but an independent vertical vibratory movement is set up in the stretched cloth which causes the wear or hammer strips 70 to repeatedly strike sharply the upper oval surfaces of the armor strips 26. I have found that this action serves to keep the screen cloth clean, even when operating on damp clay material. The wear strips 70 prevent particles of the material being handled from lodging on the armor 26, and hence wear on the screen cloth at this point is eliminated.

I have also found in the practical operation of screen structures embodying my invention, that I can dispense with the end stretching of the screen cloth and also, in some instances, I can dispense with the stretching devices at one side edge of the cloth, as I have found that when the screen cloth is once clamped and stretched edgewise or transversely to the desired tension, further adjustment of the tensioning is not ordinarily required, particularly as long as the same kind of material is being handled.

I sometimes find it desirable to interpose a thin layer of belting, cloth, rubber, or even wood, between the wear plate 25 and the stringer 16, or 14, as indicated at 72.

The spring suspension for the screen box within the outer base frame unit, as shown in the drawings, is in accordance with the disclosures of my prior application, above referred to. Mounted in boxes 51, on the upper longitudinally extending stringers 9 of the screen box, and held in place therein by clamp brackets 52, are the members 53, shown in this instance as tubular pipe sections, one near each end of and arranged to extend transversely across the screen box. The ends of these members 53 extend beyond the side stringers 9, and mounted on and secured to these projecting ends are the spiral springs 54. These spiral springs are seated in boxes 55 mounted on and bolted to the upper longitudinal side beams 1 of the base frame structure, and are securely clamped and held therein by clamp plates 56. In this manner the screen box is yieldingly suspended within the base frame structure. It is immaterial, so far as my present invention is concerned, whether the pipe sections 53 are stationarily clamped and held in boxes on the screen box or in boxes on the base frame, in which latter case the suspension springs will be mounted in boxes on the screen box stringers. In the one case the pipe sections 53 will vibrate with the screen box and in the other case they do not. In either case, the entire suspension of the screen box is taken up by the spiral springs and the weight imposed by the suspension is applied in vertical lines diametrically of the spiral springs. Thus the screen box and screen units carried thereby, as well as the load of material under treatment, are free to yieldingly vibrate under the action of the rotating unbalanced pulley structure now to be described.

Suitably mounted at its ends in seats provided therefor in stringer sections 57, connecting the cross members 15 of the screen box, is a hollow shaft 58 upon which is mounted the unbalanced pulley through the rotations of which the suspended screen box is vibrated. The ends of this pulley shaft are closed by means of plugs 59, see Fig. 15. Shaft 58 is rigidly clamped in its seats in the stringer sections 57 by means of clamp plates 60, suitably bolted or otherwise secured to the stringer sections 57.

At or near each end thereof, the shaft 58 is provided with threaded or tapped holes which extend transversely of the shaft to the hollow bore thereof. In one of these tapped holes an oil stop cock 73 is screwed and in the other of said tapped holes a solid plug 74 is screwed. In practice, I prefer to make said stop cock and plug interchangeable. The clamp plates 60 at each end of the shaft are formed on their meeting edges to receive the plug 74, or the stop cock 73, between them, thereby constituting simple and efficient means to prevent axial rotative displacement of said shaft, and also serving to reduce the danger of shearing off the oil stop cock which it is necessary to provide in order to afford means for supplying lubricant to the unbalanced pulley structure, which structure I will now describe, particular reference being had to Figs. 15, 16, 17 and 18.

Mounted upon the enlarged central portion 75 of the shaft 58 is the pulley body 76, a bushing or lining sleeve 77 being preferably interposed between the pulley body and shaft. The driving belt (not shown) through which the unbalanced pulley is rotated engages around the pulley body 76. At each end thereof the pulley body 76 has formed therewith or carries a radial web or flange 78, which in turn has formed therewith or carries an annular band 79, the radial web or flange 78 being centrally disposed with reference to said band. With this arrangement, one edge of each band 79 extends inwardly over and in encompassing relation with respect to the adjacent end of the pulley body to form a housing within which the unbalancing weights are mounted, as will be presently more fully explained. The other edge of each band 79 extends outwardly and is contracted radially towards the shaft 58, into a ring 80, which is interiorly threaded to receive a threaded collar or plug 81 mounted with a packed bearing, as indicated at 82, upon the shaft. A plate or disk 83 is mounted against the outer faces of the ring 80 and collar or plug 81. This arrangement forms a closed chamber 84 to receive and contain the oil or other lubricant, and ensures against leakage of the oil under the centrifugal force to which it is subjected when the pulley is in working operation. To still further insure against oil leakage, a packing material, 85, is interposed between the plate or disk 83 and the faces of the hub ring 80. By contracting the outer edge of the band 79 to form the ring portion 80 of smaller diameter, the threaded engagement of the collar or plug 81 into said ring is brought inside the area of greatest centrifugal force applied to the oil in chamber 84 when the pulley is in operation, thereby still further aiding in preventing oil leakage. Should, however, notwithstanding these safeguards against oil leakage, there be any leakage of the oil, I provide an oil catch or drip chamber 86, consisting, in the illustrative form shown, of a hub portion 87, mounted upon and secured to the shaft 58, and having a portion 88 which overhangs the ring 80.

In order that the oil contained in the reservoir or chamber 84 may be efficiently supplied to the various bearings and surfaces requiring lubrication, I provide oil scoops 89 in the form of pipe sections bent or curved in a direction opposite to that of the rotation of the pulley body. These oil scoops are located within the oil chambers 84 and are screwed into threaded openings formed transversely in the shaft 58, or the enlarged portion 75 of said shaft, and extending to the bore of said shaft, as indicated at 90. In operation these scoops pick up or receive the oil and conduct it to the bore of the shaft and thence through suitably disposed holes 91 and grooves 92 to the surfaces to be lubricated. The oil distributing grooves 92 preferably extend longitudinally of the pulley shaft and parallel to the axis thereof. Instead of threading the scoop members directly into the shaft, they may be threaded into holes in a collar 93 which is fastened to the shaft with the holes in the shaft and collar in line or register with each other. This structure very greatly simplifies and facilitates the manufacture and assembly of the parts, thereby cheapening the manufacturing costs. By employing bent pipe sections, I avoid the necessity of coring out castings and eliminate roughness in the surface of the bore of the scoops, thereby preventing the danger of clogging through the collection of sand, dirt, or other foreign matter in such bores, while at the same time I secure and maintain uniformity in size of the scoop bores, and hence a more uniform oil distribution is effected. In order to increase the efficiency of the oil distribution, I provide an enlarged annular recess 101, in the inner surface of the bushing 77, at about the mid-length of said bushing, and I make the hole 91 from the bore of the shaft into this annular space, of larger diameter than the other holes 91. This space 101 forms something of a secondary reservoir for the oil, the longitudinally extending grooves 92 terminating in this space or reservoir.

Figures 15, 16, 17, 18:
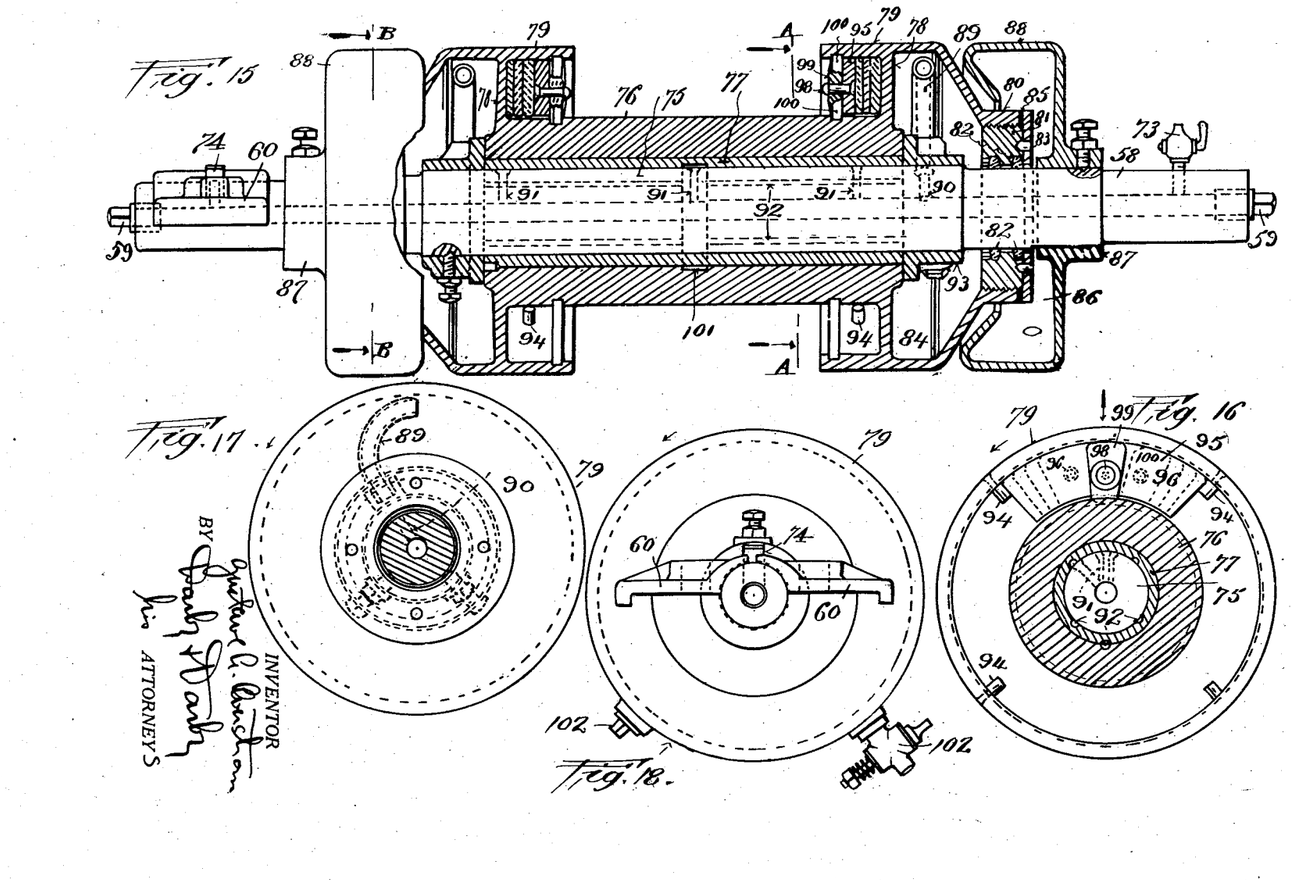
Fig. 15 is a detached detail view, partly in elevation and partly in longitudinal central section, of the unbalanced pulley structure employed to impart a high rate of vibration to the screen structure.
Fig. 16 is a view in transverse section of the same on the line A, A, Fig. 15.
Fig. 17 is a similar view on the line B, B, Fig. 15.
Fig. 18 is a view in end elevation of the structure shown in Fig. 15.

If desired, drain cocks 102 may be provided for the chambers 84, 86, see Fig. 18.

Figure 14:
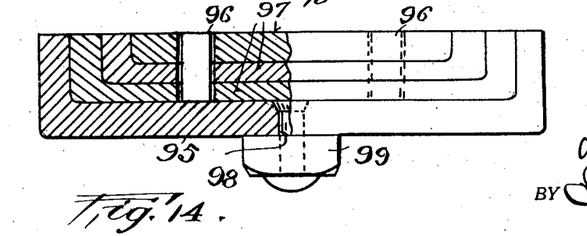
Fig. 14 is a detached detail view, partly in section, showing the structure of nested and removable unbalancing weights.

The unbalancing of the pulley structure may be secured in various ways. I have shown a very simple, effective and desirable arrangement, to which, in its broadest scope, my invention is not to be limited or restricted, wherein I mount removable weights within the housing afforded by the inwardly extending overhang of the inner edge of the band 79. Within this housing are disposed studs 94 which extend radially inwardly and are spaced apart from each other at equal distances. In the particular arrangement shown, and which, in practice, I have found effective and efficient, I employ four of these studs and locate them ninety degrees apart. The overbalancing weights consist of a series of segmental sections or members which are nested within each other. These sections are curved at their outer and inner edges to the contour, respectively, of the inner surface of the overhanging portion of band 79, and of the exterior surface of the pulley body, so as to fit snugly therebetween, and they are of a length to fit snugly between two adjacent studs or pins 94. These weight members are of U-shape in longitudinal section, as shown in Fig. 14. The outermost member 95 of the nested series, which I will call the master weight, has the spaced apart pins or studs 96 extending laterally from its inner face, which form supports for the other weight sections which are formed with holes through which the pins or studs 96 extend when the weight sections are nested together. It is the master weight member 95 which is received and fits snugly between the adjacent studs or pins 94. In practice, I prefer to make the weight sections 97, other than the master weight section 95, of different thickness and weights with relation to each other and to the master weight. This enables me to secure a desirable range of adjustment or variation of the unbalancing action. The weight members may be mounted and held in place in the housing in any suitable or convenient manner. A simple arrangement is shown wherein the master weight is equipped at its geometric center with a stud 98, which extends laterally and outwardly therefrom and upon which is pivotally carried a latch plate 99. The ends of this latch plate are received in annular grooves 100 formed in the inner surface of band 79 and the exterior surface of the pulley body, respectively, when the weights are inserted in position within the housing. This affords a very simple and convenient means to detachably lock the assembled weights in place. When it is desired to alter or vary the unbalancing action of the weights, or the rate or amplitude of vibrations, the latch plate 99 is released, the assembled weights removed and any desired one or more of the weight members taken out or replaced by another or others and the assembly again placed and secured in its housing. This structure and arrangement is not only simple but it affords ease and speed of assembly, removal and replacement. By removing the weight assembly from between any given pair of spaced studs 94, and replacing them between another pair, the wear of the bushing 77 in its bearing on the shaft 75 is distributed, and the unequal wear due to the unbalanced condition of the pulley is compensated, thereby increasing the life of the bushing.

In practice I prefer to set the machine on an incline, the extent or grade of which will be varied according to the character of the material to be handled, and according to the direction of rotation of the unbalanced pulley. I have found an inclination varying from seven to nine inches per foot of length is satisfactory when the unbalanced pulley is driven in one direction, while an inclination of from four to seven inches per foot of length is satisfactory when the pulley is driven in the other direction. By mounting the vibrating screen box within its auxiliary or outer supporting framework, as above described, thereby making the structure one unitary self-contained whole, I am enabled to easily and quickly set up the apparatus with any desired inclination and with more accuracy than has been possible heretofore.

The material to be screened is introduced to the screen box at the upper or receiving end of the machine. I have shown a receiving feed chute 103 for this purpose, which receives the material and distributes it transversely across the upper receiving end of the uppermost screen. This feed chute is mounted on or carried by the screen box, and hence vibrates therewith. This aids in properly distributing and spreading out the material on to the surface of the uppermost screen.

Each screen delivers at its lower end to its own delivery chute, the coarser or larger sizes of material being delivered from the uppermost screen, and the finer or smaller sizes are delivered from the lower screens, the very finest being delivered from the lowermost screen. I have shown a simple and efficient delivery chute arrangement, wherein the chute members 104, 105, 106, are shown respectively associated with the uppermost, the intermediate and the lowermost screen. These chutes, while delivering from different screens, are preferably, and as shown, connected together by side plates or members 107, which are pivotally connected at their upper ends to a hinge rod 108, whereby all of the delivery chutes may be rocked or swung together into raised position, when necessary or desired, to afford access to the lower or delivery ends of the screen sections, or for other purposes.

It will be seen that the hinge rod 108 is carried by framework within which the screen box is suspended, and hence the delivery chutes do not vibrate with the screen box and screens.

If desired, and in order to prevent the flying of dust, when the machine is in operation, means may be provided for confining the dust within the machine. I have shown a simple arrangement for this purpose, wherein a cover plate 109, shown in this instance as a corrugated sheet, is placed over the upper screen and is mounted and held in place within the screen box, between the side members of said box. I also provide dust cloths 110, around the bottom of the screen box. In this way the dust is confined within the screen box structure.

From the foregoing description it will be seen that I provide an exceedingly simple screen structure which is economical to build and is efficient in operation, and wherein provision is made for altering the rate of vibration or amplitude of vibration to suit various conditions or characters of material to be screened, wherein efficient lubrication of the unbalanced pulley structure is secured, wherein the screen cloths are mounted and tensioned in a most simple and effective manner, and wherein the structure, as a whole, is self-contained and capable of being transported and handled very conveniently and safely.

And while I have shown and described a specific structure as an illustrative embodiment of my invention, I wish it to be understood that in its broadest scope, as defined in the claims, my invention is not to be limited or restricted to the exact details of structure shown and described, as variations therefrom and changes therein may readily occur to persons skilled in the art without departing from the spirit and scope of my invention.

But what I claim as new and useful and of my own invention, and desire to secure by Letters Patent, is:—

1. In a vibrating screen structure, a framework including side members each having an upper and a lower beam disposed in parallel relation to each other and connected and braced together, said side members being spaced apart and the upper and lower beams of the one side member being connected, respectively, to those of the other side member, transversely extending members yieldingly supported, resilient members upon said upper beams, screening devices suspended by said transversely extending members, and means to vibrate said screening devices.

2. In a vibratory screen structure, a screen cloth, a binder strip engaging the edge thereof, a vibratory box within which said cloth is mounted, a screen cloth frame including a longitudinally extending member having a beveled surface, a cloth tensioning plate adjustably connected to said box and having one edge engaging said beveled surface and the other engaging said strip.

3. In a vibratory screen structure, a screen unit including a frame having side stringers and intermediate members parallel therewith, oval shaped strips carried at the upper edges of said intermediate members, and a screen cloth supported at its edges upon said stringers and having cushion strips secured thereto, said cushion strips resting on said oval surfaces.

4. In a vibratory screen structure, a screen unit including a frame having side stringers and intermediate members parallel therewith, oval shaped strips carried at the upper edges of said intermediate members, and a screen cloth supported at its edges on said stringers and having contact strips secured thereto to rest on said oval strips.

5. In a vibratory screen structure, a screen unit including a frame having side stringers and intermediate members parallel therewith, said side stringers having a wear plate applied as a facing to the upper surface thereof, and a screen cloth supported at its edges upon said wear plate and having its body portion resting on said intermediate members, the inner edge of said wear plate being bent or curved downwardly from the plane of the screen cloth.

6. In a vibratory screen box structure, a vibratory screen box including longitudinally extending side members, and transversely extending end members, said transversely extending end members being cut away on their outer lower portions, in combination with a screen cloth resting at its end upon a transverse end member, a plate fulcrumed at its upper edge against the outer cut away surface of an end member and engaging the end edge of the cloth, and means to tilt said plate to tension said cloth.

In testimony whereof I have hereunto set my hand on this 9th day of Feb., A. D. 1924.

GUSTAVE A. OVERSTROM.